(12) United States Patent
Elbadrashiny et al.

(10) Patent No.: US 12,307,299 B1
(45) Date of Patent: May 20, 2025

(54) SYSTEM AND METHOD FOR MANAGING AI AGENTS USING CENTRAL AGENT NAME AND ATTRIBUTE REGISTRY

(71) Applicant: Aixplain, Inc., San Jose, CA (US)

(72) Inventors: Mohamed Elbadrashiny, Staten Island, NY (US); Hassan Sawaf, San Jose, CA (US); Thiago Castro Ferreira, Rio de Janeiro (BR); Nur Al-huda Anwer Hamdan, San Jose, CA (US)

(73) Assignee: Aixplain, Inc., San Jose, CA (US)

( * ) Notice: Subject to any disclaimer, the term of this patent is extended or adjusted under 35 U.S.C. 154(b) by 0 days.

(21) Appl. No.: 18/922,050

(22) Filed: Oct. 21, 2024

(51) Int. Cl.
*G06F 9/50* (2006.01)
(52) U.S. Cl.
CPC .................. *G06F 9/5038* (2013.01)
(58) Field of Classification Search
CPC ..................................... G06F 9/5038
See application file for complete search history.

(56) References Cited

U.S. PATENT DOCUMENTS

2023/0245651 A1* 8/2023 Wang ............... G06N 5/022
704/275
2024/0298194 A1* 9/2024 Mueck ............. G06N 20/00

* cited by examiner

Primary Examiner — Sisley N Kim
(74) Attorney, Agent, or Firm — Flagship Patents; Sikander M. Khan

(57) ABSTRACT

The present disclosure relates to a system and method for generating an outcome in response to a user query using an AI agent controller equipped with a large language model. The AI agent controller receives the user query, determines a sequence of tasks required to achieve the outcome, and communicates the sequence to a Central Agent Name and Attribute Registry (CANAR) containing a repository of registered AI agents. The CANAR identifies and obtains responses from AI agents capable of executing the tasks. The AI agent controller then coordinates the execution of these tasks by the selected AI agents to generate the specified outcome. The system further includes functionalities for validating user queries, cataloging AI agents, and dynamically prioritizing tasks based on user preferences or urgency. Additionally, the system supports real-time updates of the AI agent repository and task distribution based on geographical proximity, ensuring efficient and accurate task execution.

20 Claims, 11 Drawing Sheets

SYSTEM AND METHOD FOR MANAGING AI AGENTS USING CENTRAL AGENT NAME AND ATTRIBUTE REGISTRY

CROSS REFERENCE TO RELATED APPLICATIONS

Aspects of this technology are described in an article Ahmet Gündüz, Yunsu Kim, Kamer Ali Yuksel, Mohamed Al-Badrashiny, Thiago Castro Ferreira, Hassan Sawaf, "AutoMode-ASR: Learning to Select ASR Systems for Better Quality and Cost", doi: doi.org/10.48550/arXiv.2409.1247, accepted for publication in SPECOM 2024 Conference, November 2024 and U.S. application Ser. No. 17/976,704, entitled "System and method for facilitating performing of tasks optimally using software applications", filed on Oct. 28, 2022, which is incorporated herein by reference in its entirety.

TECHNICAL FIELD

The present disclosure relates to the field of Artificial Intelligence and, more specifically, to systems and methods for managing Artificial Agents to perform a specific within the web ecosystem using a Central Agent Name and Attribute Registry (CANAR).

BACKGROUND OF THE INVENTION

The "background" description provided herein is to generally present the context of the disclosure. Work of the presently named inventors, to the extent it is described in this background section, as well as aspects of the description which may not otherwise qualify as prior art at the time of filing, are neither expressly nor impliedly admitted as prior art against the present invention.

The evolution of internet technologies has profoundly transformed how users interact with digital content. Traditionally, web interactions have been primarily passive, where users search for information and receive static content from databases or websites. This interaction model, while effective for basic tasks, often falls short in meeting the increasingly complex and dynamic needs of modern users. As the volume of online content grows exponentially, users face challenges in efficiently retrieving, synthesizing, and interacting with relevant information. Current technologies, such as traditional search engines and basic chatbots, provide limited contextual understanding and lack the ability to engage in complex, multi-step tasks that require nuanced comprehension and reasoning.

Existing technologies in the realm of internet interactions include search engines, static content repositories, and simple rule-based chatbots. Search engines utilize algorithms to index and retrieve information based on user queries, but these systems often deliver results that require extensive filtering by the user to find the most relevant information. Rule-based chatbots, while offering some level of interactivity, are constrained by predefined scripts and lack the ability to adapt to complex user needs or learn from interactions over time.

The limitations of these existing technologies are evident in scenarios that demand personalized, contextually aware, and multi-step processing of information. For instance, tasks such as translating a video from one language to another, generating real-time summaries of dynamic content, or assisting with complex problem-solving require a level of intelligence and adaptability that current systems are not equipped to provide. These challenges are compounded by the growing expectation of users for seamless, intuitive, and responsive digital experiences.

In response to these challenges, the integration of Large Language Models (LLMs) as intelligent agents within the web represents a transformative approach. LLMs, such as GPT-based models, are capable of understanding and generating human-like text based on vast amounts of training data. When embedded within web technologies, these models can function as "super agents," capable of autonomously scanning online data, performing tasks like personalized content curation, real-time information synthesis, and facilitating seamless conversational interactions.

Despite the potential of LLMs, the current implementation of these models on the Internet is limited. There is a need for a system that can effectively integrate LLMs with existing web technologies to create a more dynamic and responsive digital ecosystem. Such a system would enable users to engage in more complex interactions, where the LLMs could autonomously select and coordinate between various specialized agents to complete multi-step tasks, thus significantly enhancing user experience.

Thus, there exists a need for an advanced system and method that integrates LLMs as intelligent agents within the web, enabling more dynamic, contextually aware, and personalized online interactions. This system should be capable of learning and adapting from user interactions, thereby transforming the internet from a passive repository of information into an interactive, intelligent partner in users' daily lives.

SUMMARY

In an exemplary embodiment, a computer-implemented method includes receiving, using an AI agent controller comprising a large language model, a user query specifying an outcome. The method further includes determining, by the AI agent controller, a sequence of tasks to be performed to generate the outcome in response to the user query by analyzing the user query. The AI agent controller then communicates the sequence of tasks to a Central Agent Name and Attribute Registry (CANAR) comprising a repository of a plurality of registered artificial intelligence (AI) agents. The CANAR 208 obtains an affirmative response from at least one AI agent from the plurality of registered AI agents capable of executing at least one of the plurality of registered AI tasks and returns a list of responding AI agents to the AI agent controller. The AI agent controller then generates the outcome in response to the user query by enabling the responding AI agents to execute the tasks in the determined sequence.

In another exemplary embodiment, a system comprises at least one processor and a memory device storing computer-executable instructions. When executed by the at least one processor, these instructions cause the system to perform operations including receiving, using an AI agent controller comprising a large language model, and a user query specifying an outcome. The system further determines, by the AI agent controller, a sequence of tasks to be performed to generate the outcome in response to the user query by analyzing the user query, and communicates, by the AI agent controller, the sequence of tasks to an CANAR 208 comprising a repository of a plurality of registered technical agents. The CANAR 208 obtains an affirmative response from at least one agent from the plurality of registered AI agents capable of executing at least one of the plurality of registered AI tasks and returns a list of responding AI agents to the AI agent controller. The system then generates the outcome in response to the user query by enabling the responding AI agents to execute the tasks in the determined sequence.

In another exemplary embodiment, a non-transitory computer-readable storage medium storing instructions which, when executed by at least one processor, cause the at least one processor to perform operations for generating an outcome in response to a user query is disclosed. The operations include receiving, using an AI agent controller comprising a large language model, a user query specifying an outcome; determining, by the AI agent controller, a sequence of tasks to be performed to generate the outcome in response to the user query by analyzing the user query; communicating, by the AI agent controller, the sequence of tasks to an CANAR 208 comprising a repository of a plurality of registered artificial intelligence (AI) agents; obtaining, by the CANAR 208, an affirmative response from at least one AI agent from the plurality of registered AI agents capable of executing at least one of the plurality of registered AI tasks and returning a list of responding AI agents to the AI agent controller; and generating, by the AI agent controller, the outcome in response to the user query by enabling the responding AI agents to execute the tasks in the determined sequence.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
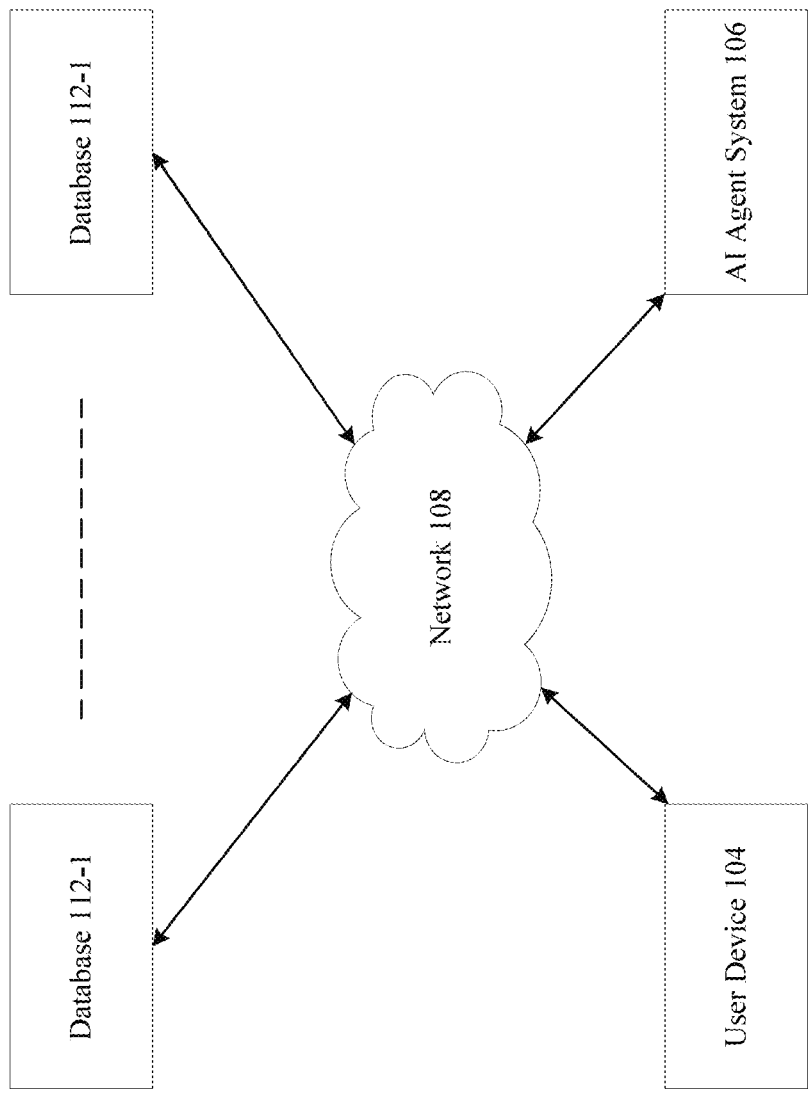
FIG. 1A is a diagram showing an exemplary network system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method for generating an outcome in response to a user query by leveraging a network of artificial intelligence (AI) agents through an AI CANAR 208. The system includes an AI agent controller that comprises a large language model configured to receive a user query specifying the desired outcome. Upon receiving the query, the AI agent controller determines a sequence of tasks that need to be performed to achieve the specified outcome. This sequence of tasks is then communicated to the CANAR 208, which manages a repository of registered AI agents.

The CANAR 208 queries its repository to identify and obtain affirmative responses from AI agents capable of executing the tasks identified by the AI agent controller. The system then generates the outcome by enabling the selected AI agents to execute the tasks in the determined sequence. The AI agent controller ensures that each task is performed efficiently, dynamically prioritizing tasks based on user preferences or urgency, and adjusting the sequence of tasks based on intermediate outputs from the AI agents.

The system is further configured to validate user queries against offensive content, catalog the AI agents based on their functionalities and geographical availability, and store logs of completed tasks to optimize future queries. The CANAR 208 is capable of updating the repository of AI agents in real-time as new agents become available or existing ones are modified. Additionally, the system supports the distribution of tasks based on the geographical proximity of the AI agents, enhancing the efficiency of task execution.

Thereby, the present disclosure provides a robust framework for automating complex processes by orchestrating the capabilities of multiple AI agents, ensuring that the desired outcomes are generated in a precise and efficient manner.

FIG. 1A shows an example network diagram 100 utilized to describe the various disclosed embodiments. In the example network diagram 100, a user device 104, an AI agent system 106, and a plurality of databases 112-1 through 112-N, hereinafter referred to individually as a database 112 and collectively as databases 112, are communicatively connected via a network 108. The network 108 may include, but is not limited to, a wireless, cellular, or wired network, a local area network (LAN), a wide area network (WAN), a metro area network (MAN), the Internet, the worldwide web (WWW), similar networks, or any combination thereof.

The user device 104 may be, but is not limited to, a personal computer, a laptop, a tablet computer, a smartphone, a wearable computing device, or any other device capable of receiving and displaying notifications. The user device 104 interacts with the AI agent system 106 through the network 108 to send user queries and receive the generated outcomes.

The AI agent system 106 is configured to receive and process user queries from the user device 104. Upon receiving a query, the AI agent system 106 analyzes the query, determines a sequence of tasks required to generate the desired outcome, and communicates with the appropriate databases 112-1 through 112-N to retrieve the necessary information. The AI agent system 106 may include various components such as processors, memory, and communication modules to execute these tasks and manage the interaction with the databases 112.

The databases 112-1 through 112-N store various types of data that the AI agent system 106 can access to perform the tasks necessary to respond to the user query. The databases 112 may contain text documents, images, videos, and other forms of data that are required for generating the outcome of the user query. The AI agent system 106 retrieves the data over the network 108 and processes the according to the determined sequence of tasks, generating the desired output which is then sent back to the user device 104.

Figure 1B:
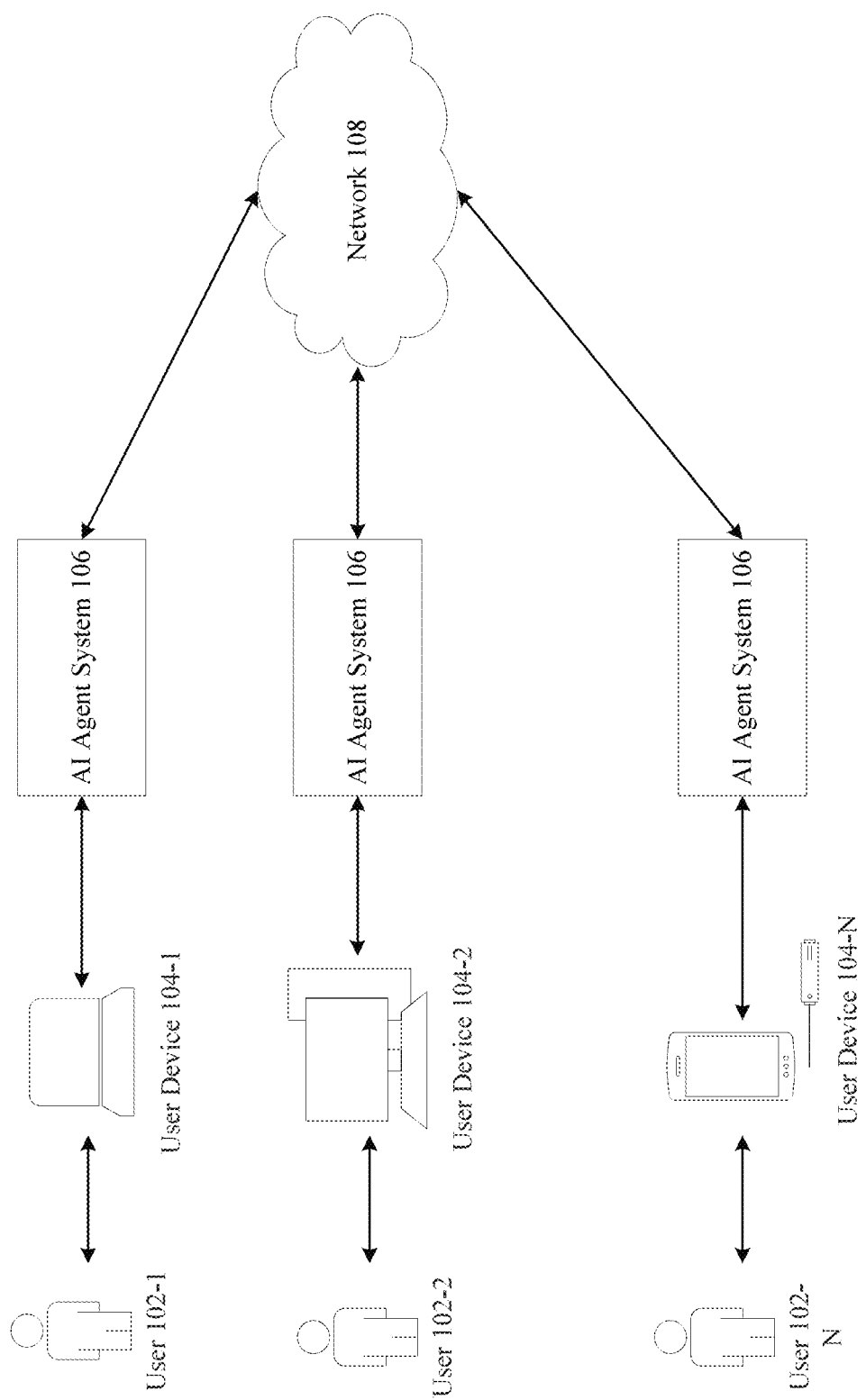
FIG. 1B shows an exemplary architecture of an AI agent system implemented in a network environment, according to certain embodiments.

FIG. 1B shows an exemplary architecture of the AI agent system 106 implementation in a network environment 110B. The network environment 100*b* includes users (102-1, 102-2, ..., 102-N), enabled to operate one or more user devices (104-1, 104-2, ..., 104-N) communicatively coupled to the AI agent system 106 through the network 108.

Users 102 represent individuals or entities that interact with the AI agent system 106 through the user devices 104. The users 102 may encompass a variety of roles within an organization or external parties that require access to, or interaction with, the AI agent system 106. Examples of the users 102 include employees within a company, customers seeking services or products, and partners or vendors involved in business operations.

In a corporate environment, employees, such as managers and data analysts, frequently interact with the AI agent system 106. Managers may query the AI agent system 106 to obtain business intelligence reports, track project statuses, or receive alerts related to key performance indicators (KPIs). For example, a marketing manager might request a summary of the latest sales trends, and the AI agent system 106 would retrieve and process relevant data from the databases 112 to generate the required report. Data analysts may utilize the AI agent system 106 to extract and analyze large datasets to identify patterns or generate predictive models. For example, a data analyst might access the system to gather customer behavior data and apply machine learning models to predict future purchasing trends. The users 102, thus, interact with the AI agent system 106 to get certain tasks performed.

The AI agent system 106 generally functions as an interface to all, or a subset of, enterprise data, information, and system functionality (e.g., via the network 108). The AI agent system 106 interacts with various components of the network 108 for accessing a variety of enterprise data and information as well as affecting change within the enterprise. The AI agent system 106 may use this enterprise data (and optionally externally available data) and information to generate a model or expand a pre-built model. The model may comprise a semantic model that ties various types of data to each other based on, for example, logic and rules, semantic relationships, and the like. The model may be monolithic or segmented/partitioned and may comprise language-specific/language-independent elements. The model may provide a description and/or map of pieces of information relevant to an enterprise and may be monolithic, or may be segmented, and may comprise language-specific and/or language-independent elements. The model may map generic or abstract concepts to real-world concepts, describe relationships within business concepts and systems, and provide an understanding of how words or terms, etc., are used, such as by a person, groups of persons, and the like. The understanding may further be classifiable to characteristics that identify a person or groups of persons and the like, such as a person's native language, a person's education, a person's current role in an enterprise, demographics of the person, and the like. In this way, understanding of how words or terms are used may be enriched even with restricted access to knowledge of a person, such as might occur when protecting personally identifying information of a person, and the like. The model may incorporate how a business or company uses terms/words and in what contexts the terms/words may be used. The model may comprise a business- and application-specific knowledge graph that the AI agent system 106 can use for general knowledge query, customer-specific master data/facts, identification/contextualization of mapped external data sources for access, as well as elements to support reasoning, disambiguation, etc.

The AI agent system 106 may generally function as an omni-channel, intelligent, proactive virtual agent with respect to the user devices 104-1 through 104-N. The AI agent system 106 may receive queries, commands, or other requests from the user devices 104-1 through 104-N via a variety of communication channels. The AI agent system 106 may use the model to respond to the queries, commands, or other requests from the user devices 104-1 through 104-N. For example, with queries, the AI agent system 106 can refer to or look to the model to obtain answers to the queries. The AI agent system 106 can also initiate communication to the user devices 104-1 through 104-N regarding workflow (e.g., initiate meeting reminders or contact user devices 104-1 through 104-N regarding the status of a project) via a variety of communication channels.

The AI agent system 106 may be used with enterprise systems of a variety of industries, e.g., aerospace, manufacturing, agriculture, shipping, oil and gas, mining, construction, etc. Embodiments of the model, such as a semantic model embodiment, may reflect the unique terminology used in a particular industry, within a particular enterprise in the industry, within a particular enterprise independent of its industry, and the like. In embodiments, the model may reflect how terms relate to each other in a hierarchy or other semantic organization, such as represented by a graph. As appreciated by one of ordinary skill in the art, the AI agent system 106 may be used with other industries, independent of use in the other industries.

The AI agent system 106 may, without limitation, provide the following functionalities: obtain answers to questions from the user devices 104-1 through 104-N about a business, such as metrics about the business, knowledge of how and where the business conducts business, information about products and services of a business, information about the market or industry of the business, information about how a business is organized, and the like, engage in conversation with users via the user devices 104-1 through 104-N, provide assistance with workflows, listen to requests from the user devices 104-1 through 104-N, take actions based on requests, initiate communication with employees of an enterprise, with customers of the enterprise (including to implement complex speech dialogs) and with others that have some relationship to the enterprise (such as contractors, prospective customers, partners, investors, board members, managers, vendors, suppliers, service providers, and many others), and the like. References to "users" of the AI agent system should be understood to encompass these and other types of users. The AI agent system 106 may initiate suggested actions to the user devices 104-1 through 104-N (e.g., the AI agent system can send a hint of suggested actions to the user devices 104-1 through 104-N).

The AI agent system 106 may be optimized over time as new amounts of data are incorporated into the model. In embodiments, the system may evolve and become smarter in terms of industry and customer knowledge, user behaviors, preferences, use of words and terms, and additional languages. This may, for example, result in faster response times, greater relevance of responses, fewer exchanges to satisfy an inquiry, and the like.

FIG. 1B, thus, shows a single network 108 between the user devices 104-1 through 104-N and the AI agent system 106, the user devices 104-1 through 104-N and the AI agent system 106 may be on the same network 108. In some embodiments, there may be multiple networks 108 between the user devices 104-1 through 104-N and the AI agent system 106 that are interconnected. The network 108 may be a private network, a public network, or a hybrid network. The network 108 may be a local area network or wide area network.

The network 108 may be connected via wired or wireless links. Wired links may include Digital Subscriber Line (DSL), coaxial cable lines, Ethernet, fiber-optic, or other links used for network infrastructure as would be understood by one of ordinary skill in the art. The wireless links may include cellular, BLUETOOTH, Wi-Fi, Worldwide Interoperability for Microwave Access (WiMAX), an infrared channel, satellite bands, or other wireless networking technologies as would be understood by one of ordinary skill in the art. The wireless links may also include any cellular network standards used to communicate among mobile devices, including standards that qualify as 1G, 2G, 3G, 4G, 5G, LTE, or the like. The network standards may qualify as one or more generations of mobile telecommunication standards by fulfilling a specification or standards such as the specifications maintained by the International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, HSPA, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 108 may be any type and/or form of network. The geographical scope of the network 108 may vary widely and the network 108 can be a body area network (BAN), a personal area network (PAN), a local-area network (LAN), e.g., Intranet, a metropolitan area network (MAN), or a wide area network (WAN), e.g., the Internet. The topology of the network 108 may be of any form and may include, e.g., any of the following: point-to-point, serial, bus, star, ring, mesh, or tree. The network 108 may be an overlay network which is virtual and sits on top of one or more layers of other networks. The network 108 may be of any such network topology as known to those ordinarily skilled in the art capable of supporting the operations described herein. The network 108 may utilize different techniques and layers or stacks of protocols, including, e.g., the Ethernet protocol, the Internet protocol suite (e.g., TCP/IP, UDP/IP, etc.), the ATM (Asynchronous Transfer Mode) technique, the SONET (Synchronous Optical Networking) protocol, or the SDH (Synchronous Digital Hierarchy) protocol. The TCP/IP Internet protocol suite may include application layer, transport layer, Internet layer (including, e.g., IPv6), or the link layer. The network 108 may be a type of a broadcast network, a telecommunications network, a data communication network, or a computer network.

In some implementations, one or more of users 102-1 through 102-N may access the AI agent system 106 (e.g., using one or more of user devices 104-1 through 104-N). The AI agent system 106 may include one or more user interfaces, such as browsers and textual or graphical user interfaces, through which users 102-1 through 102-N may access the AI agent system 106.

Figure 1C:
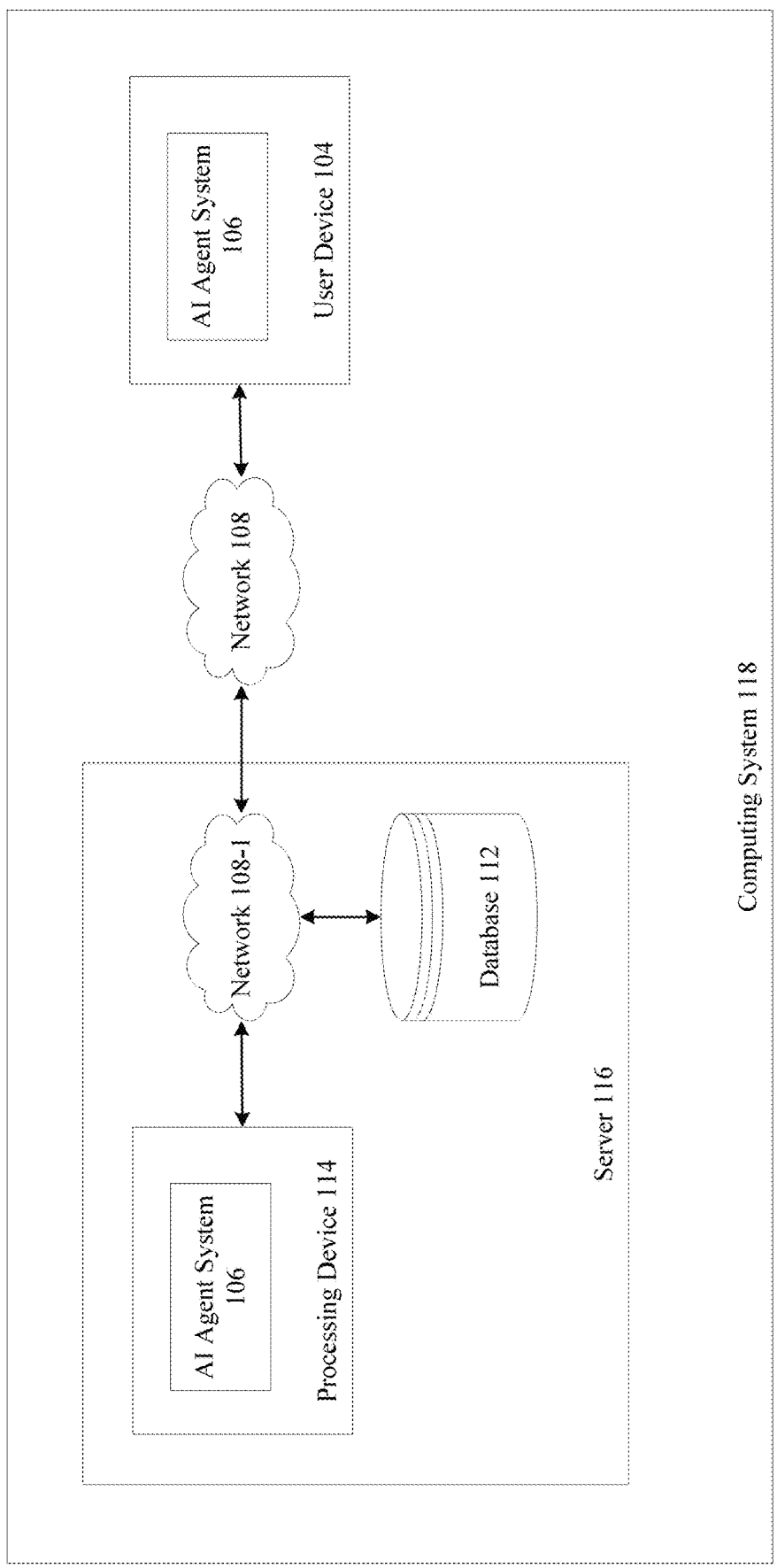
FIG. 1C is a block diagram that illustrates a first example of the AI agent system, according to certain embodiments.

FIG. 1C is a block diagram that illustrates a first example system 100C, in accordance with some embodiments of the present disclosure. As discussed herein, the AI agent system 106 may include logic that enables the operations and systems described herein when executed. In one embodiment, system 100C may be described as a computing system 118, including means for performing the operations described herein. In one embodiment, the AI agent system 106 resides in whole or in part on a computing system 118 of the system 100C. In another embodiment, the AI agent system 106 resides in whole or in part on an edge network device, such as a user device 104-1 through 104-N of system 100C. In yet another embodiment, the AI agent system 106 resides in whole or in part on any combination of the two or in a different system entirely.

The computing system 118 may include various components, which may allow the AI agent system 106 to run on a server device or user device 104. Each component may perform different functions, operations, actions, processes, methods, etc., for the embodiments described herein and/or may provide different services, functionalities, and/or resources for the embodiments described herein. As illustrated in FIG. 1C, computing system 118 includes the AI agent system 106, a processing device 114, a database 112, and a network 108. The AI agent system 106, the processing device 114, and the database 112 may be coupled to each other via network 108. Network 108 may be a public network, a private network, or a combination thereof. In one embodiment, network 108 may include a wired or a wireless infrastructure, which may be provided by one or more wireless communications systems, such as a Wi-Fi hotspot connected with the network 108 and/or a wireless carrier system that can be implemented using various data processing equipment, communication towers, etc. The network 108 may carry communications between the various components of computing system 118. The database 112 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Each component may include hardware such as processing devices (e.g., processors, central processing units (CPUs), graphics processing units (GPUs)), memory (e.g., random access memory (RAM)), storage devices (e.g., hard-disk drive (HDD), solid-state drive (SSD), etc.), and other hardware devices (e.g., sound card, video card, etc.). The computing system 118 may comprise any suitable type of computing device or machine that has a programmable processor including, for example, server computers, desktop computers, laptop computers, tablet computers, smartphones, set-top boxes, etc. In some examples, the computing system 118 may comprise a single machine or may include multiple interconnected machines (e.g., multiple servers configured in a cluster). The computing system 118 may be implemented by a common entity/organization or may be implemented by different entities/organizations.

Figure 1D:
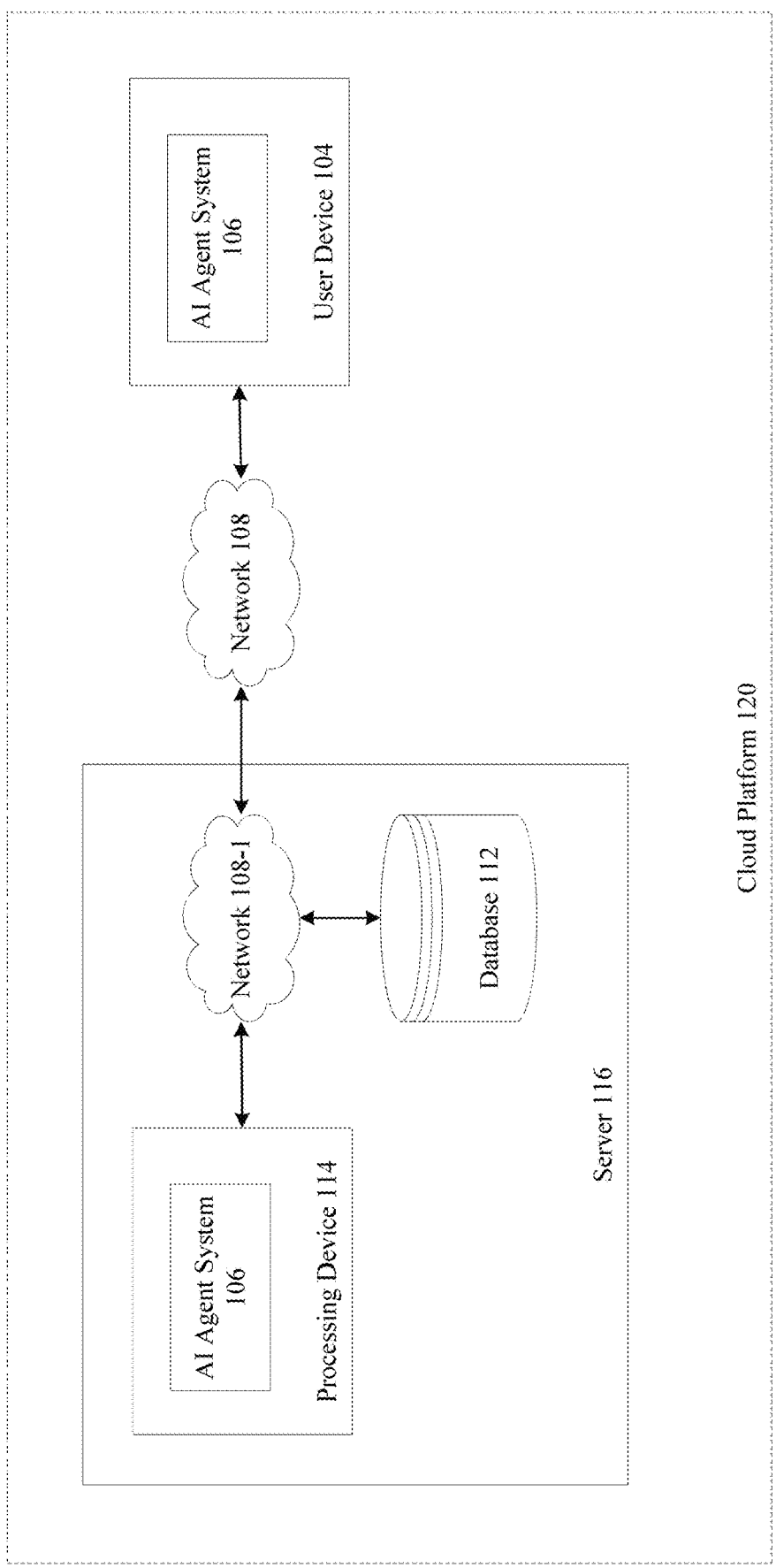
FIG. 1D is a block diagram that illustrates a second example of the AI agent system, according to certain embodiments.

FIG. 1D is a block diagram that illustrates a second example system 100D, in accordance with some embodiments of the present disclosure. System 100D includes a cloud platform 120, which may include one or more components. As discussed herein, AI agent system 106 may include logic that enables the operations and systems described herein when executed. In one embodiment, system 100D may be described as a cloud platform 120, including means for performing the operations described herein (e.g., server 116, network 108, user device 104, etc.). In one embodiment, AI agent system 106 resides in whole or in part on a server (e.g., server 116) of system 100D. In another embodiment, AI agent system 106 resides in whole or in part on a user device (e.g., user device 104) of system 100D. In yet another embodiment, AI agent system 106 resides in whole or in part on any combination of the two or in a different system entirely.

Server 116 may include various components, which may allow AI agent system 106 to run on a server device or user device 104. Each component may perform different functions, operations, actions, processes, methods, etc., for the embodiments described herein and/or may provide different services, functionalities, and/or resources for the embodiments described herein.

As illustrated in FIG. 1D, server 116 includes an AI agent system 106, a processing device 114, a database 112, and a network 108. The AI agent system 106, the processing device 114, and the database 112 may be coupled to each other via network 108. Network 108 may be a public network, a private network, or a combination thereof. In one embodiment, network 108 may include a wired or a wireless infrastructure, which may be provided by one or more wireless communications systems, such as a Wi-Fi hotspot connected with the network 108 and/or a wireless carrier system that can be implemented using various data processing equipment, communication towers, etc.

The network 108 may carry communications between the various components of server 116. The database 112 may be a persistent storage that is capable of storing data. Persistent storage may be a local storage unit or a remote storage unit. Persistent storage may be a magnetic storage unit, optical storage unit, solid-state storage unit, electronic storage units (main memory), or a similar storage unit. Persistent storage may also be a monolithic/single device or a distributed set of devices.

Each component may include hardware such as processing devices (e.g., processors, central processing units (CPUs), graphics processing units (GPUs)), memory (e.g., random access memory (RAM)), storage devices (e.g., harddisk drive (HDD), solid-state drive (SSD), etc.), and other hardware devices (e.g., sound card, video card, etc.). The server 116 may comprise any suitable type of computing device or machine that has a programmable processor including, for example, server computers, desktop computers, laptop computers, tablet computers, smartphones, set-top boxes, etc. In some examples, the server 116 may comprise a single machine or may include multiple interconnected machines (e.g., multiple servers configured in a cluster). The server 116 may be implemented by a common entity/organization or may be implemented by different entities/organizations.

In one embodiment, server 116 is operably connected to user device 104 via network 108. Network 108 may be a public network, a private network, or a combination thereof.

In one embodiment, network 108 may include a wired or a wireless infrastructure, which may be provided by one or more wireless communications systems, such as a Wi-Fi hotspot connected with the network 108 and/or a wireless carrier system that can be implemented using various data processing equipment, communication towers, etc. The network 108 may carry communications between the various components of system 100D. User device 104 may include AI agent system 106, in addition to, or alternatively from, server 116.

Figure 1E:
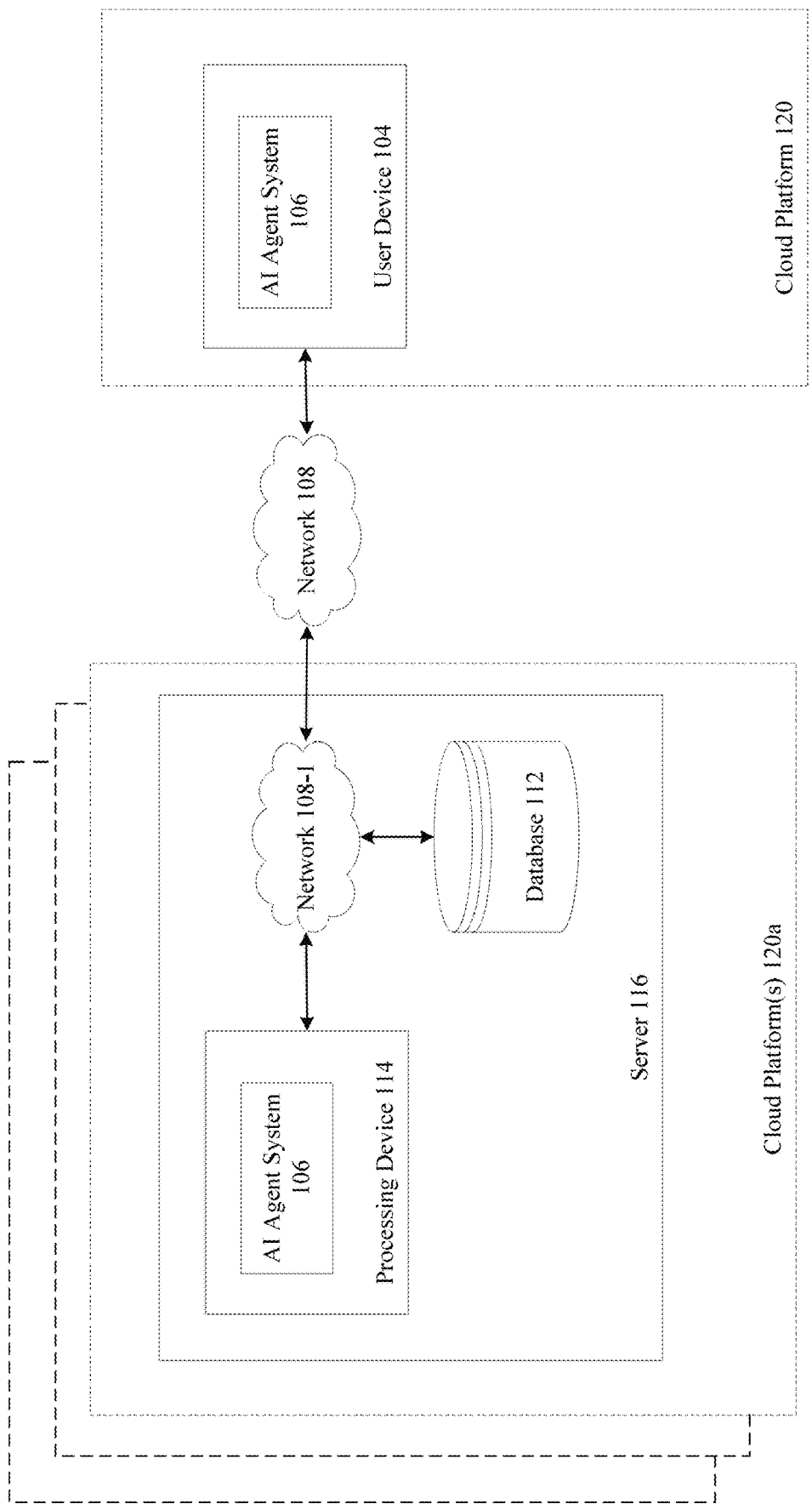
FIG. 1E is a block diagram that illustrates a third example of the AI agent system, according to certain embodiments.

FIG. 1E is a block diagram that illustrates a third example system 100E, in accordance with some embodiments of the present disclosure. System 100E includes a cloud platform 120, which may include one or more components. As contemplated herein, the cloud platform 120 may represent any number of edge and/or central cloud platforms, which may include any number of components, such as edge and cloud applications, infrastructure services, workload orchestration components, virtualization components, and operating system components.

As discussed herein, the AI agent system 106 may include logic that enables the operations and systems described herein when executed. In one embodiment, system 100E may be described as a cloud platform 120, including means for performing the operations described herein, such as the server 116, network 108-1, and user device 104. In one embodiment, the AI agent system 106 resides in whole or in part on the server 116 of system 100E. In another embodiment, the AI agent system 106 resides in whole or in part on the user device 104 of system 100E. In yet another embodiment, the AI agent system 106 resides in whole or in part on any combination of the two, or in a different system entirely.

The server 116 may include various components, which may allow the AI agent system 106 to run on the server 116 or the user device 104. Each component may perform different functions, operations, actions, processes, and methods for the embodiments described herein and/or may provide different services, functionalities, and resources for the embodiments described herein.

As illustrated in FIG. 1C, the cloud platform 120 includes the AI agent system 106, the processing device 114, the database 112, and the network 108-1. The AI agent system 106, the processing device 114, and the database 112 may be coupled to each other via the network 108. The network 108-1 may be a public network, a private network, or a combination thereof. In one embodiment, network 108 may include a wired or a wireless infrastructure, which may be provided by one or more wireless communications systems, such as a Wi-Fi hotspot connected with the network 108-1 and/or a wireless carrier system that can be implemented using various data processing equipment, communication towers, etc.

The network 108-1 may carry communications, such as data, messages, packets, and frames, between the various components of the cloud platform 120 and/or between a variety of systems. The database 112 may be a persistent storage that is capable of storing data. A persistent storage may be a local storage unit or a remote storage unit. Persistent storage may be a magnetic storage unit, optical storage unit, solid-state storage unit, electronic storage units such as main memory, or a similar storage unit. Persistent storage may also be a monolithic/single device or a distributed set of devices.

Each component may include hardware such as processing devices, for example, processors, central processing units (CPUs), and graphical processing units (GPUs); memory, such as random access memory (RAM); storage devices, such as a hard-disk drive (HDD) and solid-state drive (SSD); and other hardware devices, such as sound cards and video cards. The cloud platform 120 may comprise any suitable type of computing device or machine that has a programmable processor, including, for example, server computers, desktop computers, laptop computers, tablet computers, smartphones, and set-top boxes. In some examples, the cloud platform 120 may comprise a single machine or may include multiple interconnected machines, such as multiple servers configured in a cluster. The cloud platform 120 may be implemented by a common entity/ organization or may be implemented by different entities/ organizations. For example, the cloud platform 120 may be operated by a first company/corporation, and a second cloud platform (not pictured) may be operated by a second company/corporation. Each server may execute or include an operating system (OS), as discussed in more detail below. The OS of the server may manage the execution of other components, such as software and applications, and/or may manage access to the hardware, such as processors, memory, and storage devices, of the computing device.

In one embodiment, the server 116 is operably connected to the user device 104 via the network 108. The network 108 may be a public network, such as the internet, a private network, such as a local area network (LAN) or wide area network (WAN), or a combination thereof. In one embodiment, network 108 may include a wired or a wireless infrastructure, which may be provided by one or more wireless communications systems, such as a Wi-Fi hotspot connected with the network 108 and/or a wireless carrier system that can be implemented using various data processing equipment, communication towers, etc. The network 108 may carry communications, such as data, messages, packets, and frames, between the various components of system 100E. The user device 104 may include the AI agent system 106, in addition to, or alternatively from, the server 116.

Figure 2:
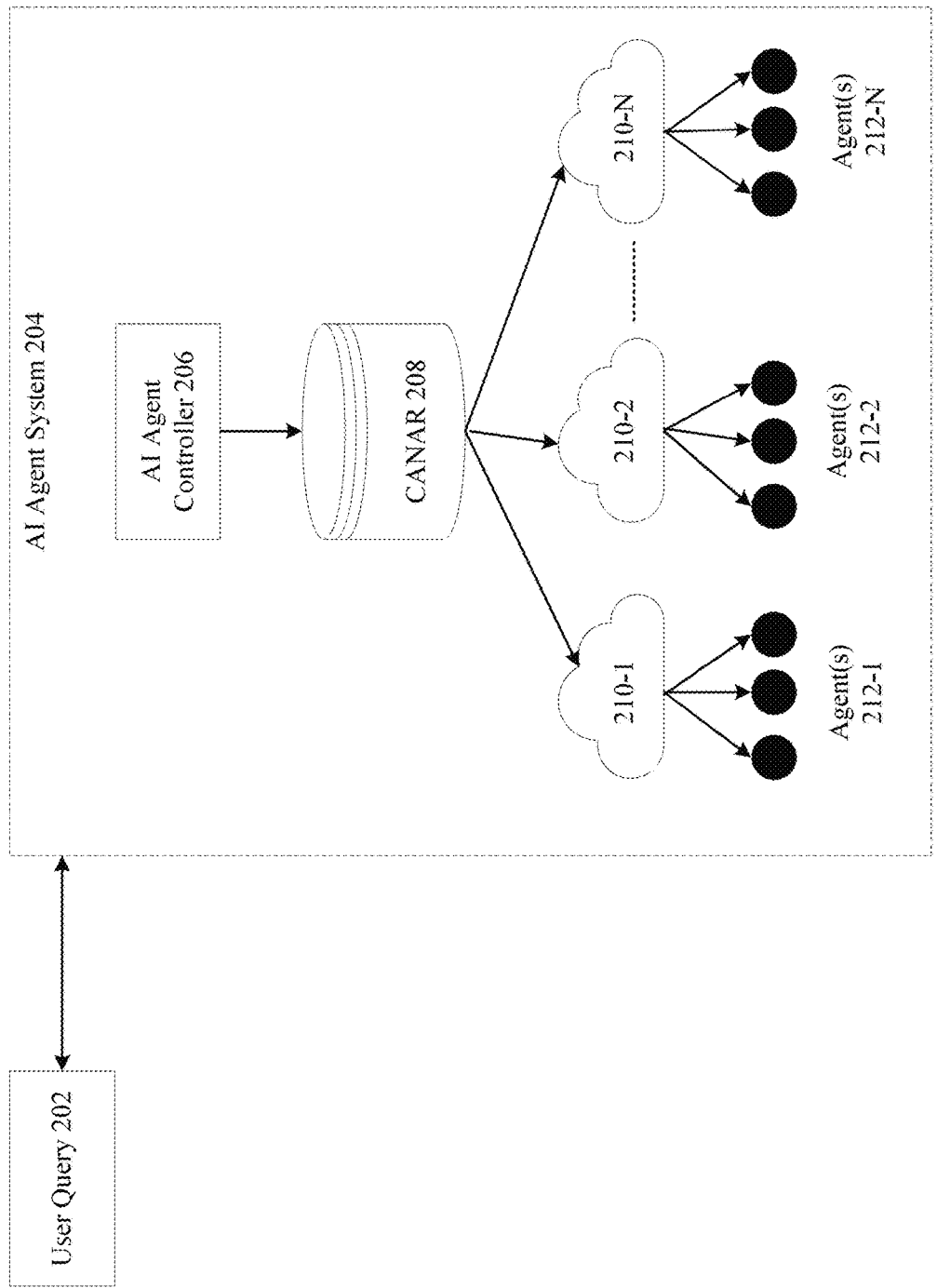
FIG. 2 illustrates an exemplary system for generating an outcome in response to a user query, according to certain embodiments.

FIG. 2 illustrates an exemplary system 200 for generating an outcome in response to a user query, in accordance with some embodiments of the present disclosure. The system 200 is configured to facilitate complex task execution through the interaction of a plurality of components, including the AI agent controller 206, the User Query 202, the AI agent system 204, a Central Agent Name and Attribute Registry (CANAR) 208, and a plurality of websites 210-1, 210-2, and 210-N, each comprising respective AI agents 212. The AI agent system 204 is a representation of the AI agent system 106, as described with conjunction of FIG. 1A-FIG. 1E.

The AI agent controller 206, alternatively referred to as a super-agent, is based on integration on large language models (LLMs) and other forms of artificial intelligence to perform one or more tasks related to a plurality of AI agents 212. In one implementation, the AI agent controller 206 may include an ultra large language model (ULLM). The AI agent 212 is an autonomous entity capable of independently making decisions based on one or more inputs and take independent actions. Such independent decisions may be taken proactively or responsively in accordance with established objectives and/or self-originated objectives of the artificial intelligence agents. Artificial intelligence agents include one or more machine learning modules and one or more decision policies that can be implemented to perform a particular function in order to meet its established and/or self-originated objectives.

In one aspect of the present embodiment, a website, denoted as website 210, hosts a set of AI agents designed to perform specialized tasks. For instance, website 210-1, which offers image processing services, is integrated with a series of AI agents, 212-1, 212-2, . . . , 212-N. Each AI agent within this set is configured to execute specific functions related to the broader domain of image processing. These functions might include, but are not limited to, tasks such as text analysis, image enhancement, video processing, object recognition, and other related operations.

The website 210 or a digital platform, in one aspect, registers with the AI agent controller 206. The registration process involves the logging and cataloguing of each AI agent 212 associated with the website 210 into a central repository maintained by the AI agent controller 206. The repository serves as a comprehensive directory of all registered AI agents, detailing the specific capabilities, availability, and geographical distribution of each AI agent.

The AI agent controller 206 is configured for managing the interaction between the user and the AI agents. When a user initiates a query 202 via a user device, the AI agent controller 206 is configured to receive and process this user query 202. The user query 202 typically specifies a desired outcome, prompting the AI agent controller 206 to engage in a detailed analysis to determine the most appropriate sequence of tasks required to achieve the specified outcome.

The AI agent controller 206 dynamically performs the execution of the tasks by the selected AI agents 212. The execution includes the initial task allocation but also the continuous monitoring and adjustment of the task execution sequence. The AI agent controller 206 is equipped to handle real-time adjustments based on the intermediate outputs generated by the AI agents 212, ensuring that the final outcome aligns precisely with the user's specified requirements.

The AI agent controller 206 interacts with the AI agents 212 through the CANAR 208. The CANAR 208 serves as a central registry and management system for all AI agents 212 integrated into the broader network. Unlike traditional DNS systems that resolve domain names to IP addresses, the CANAR 208 resolves tasks or queries to the appropriate AI agents that are capable of executing those tasks.

The CANAR 208 is implemented as a dedicated server or a distributed network of servers, which maintain a comprehensive repository of AI agents 212. In one example, the AI agents 212 are identified and invoked by their respective domain names. The repository includes detailed metadata about each AI agent 212, such as their specific capabilities, current operational status, geographical location, performance metrics, and task specializations. The repository enables the CANAR 208 to efficiently manage and allocate tasks to the most suitable AI agents 212.

In one embodiment, the CANAR 208 is configured to perform the resolution of user queries by efficiently managing and directing tasks to the appropriate technical agents. With the basic functionality of domain name resolution, the CANAR 208 ensure optimal task assignment, coordination, and execution within the multi-agent environment.

The CANAR 208 includes one or more Central Agent Name (CAN) agents that operate by leveraging a combination of real-time decision-making and pre-trained models to effectively manage the registry of technical agents. Upon receiving a task sequence from the AI agent controller, the CAN agent initiates a query across its repository to identify the most suitable technical agents. This query process is driven by an inference model that evaluates the capabilities of each registered technical agent against the specific requirements of the task.

The CAN agent uses complex algorithms to match tasks with agents based on multiple criteria, including the nature of the task, the performance metrics of the agents, current workload, and geographical proximity (if applicable). Once a match is identified, the CAN agent establishes a communication link between the AI agent controller and the selected technical agents, ensuring that the task sequence is executed in the correct order and within the designated parameters.

The CAN agents are trained using a supervised learning approach, where large datasets consisting of various task assignments and agent performance metrics are used. The training process involves feeding the CAN agent with scenarios that simulate different user queries, tasks, and technical agent capabilities. Through this training, the CAN agents learn to recognize patterns in task-agent suitability, optimizing their decision-making process over time.

In one implementation, to enhance their performance, the CAN agents are also trained using reinforcement learning techniques, where they receive feedback based on the success of task assignments. For example, if a task sequence is executed efficiently and meets the user's desired outcome, the CAN agent's model parameters are adjusted to reinforce the decision-making path that led to this success. Conversely, if the task execution fails or underperforms, the CAN agent learns to avoid similar decisions in the future.

The inference model within the CAN agent is designed to process incoming queries and make real-time decisions about task assignments. The inference model is typically a neural network that has been fine-tuned on vast amounts of task execution data. The inference model takes into account various inputs, such as the type of task, the current state of the technical agents, historical performance data, and other contextual information.

The inference process involves multiple layers of decision-making, where the CAN agent first filters potential technical agents based on basic criteria, then applies more granular analysis to select the optimal agent. This process may include evaluating the agent's previous interactions, current load, expected response time, and compatibility with other agents in the task sequence.

Referring back to FIG. 2, interaction between the CANAR 208 and AI agents 212 is initiated with the registration process. When a new AI agent 212 is introduced to the AI agent system 204, the AI agent 212 is registered with the CANAR 208, providing all relevant metadata about its functionalities, location, and other operational details. The CANAR 208 logs this information into its repository, ensuring that the AI agent 212 is available for future task assignments.

In accordance with one embodiment, the AI agent system 204 includes a processor and a memory device that stores computer-executable instructions. These instructions, when executed by the processor, enable the AI agent controller to perform one or more steps, in accordance with the present embodiment.

In one embodiment, the AI agent controller 206 receives the user query 202 raised by a user through a user device. The user query 202, within the context of the AI agent system 204, refers to the input or request submitted by a user through a user interface, typically via the user device, such as a computer, smartphone, or other digital platform. The user query 202 represents the user's specific requirement or desired outcome, which the AI agent system 204 is tasked with addressing. The user query 202 may include a wide range of requests, depending on the system's capabilities, including but not limited to data retrieval, content generation, image or video processing, natural language processing, or any other AI-driven tasks.

Upon receiving the user query 202, the AI agent controller 206 analyses the user query 202. By analyzing the user query 202, the AI agent controller 206, determines a sequence of tasks to be performed to generate the outcome in response to the user query 202. For analysis, the AI agent controller 206 utilizes one or more computational techniques, such as natural language processing (NLP) and contextual understanding, to interpret the user's intent accurately.

The AI agent controller 206 is equipped with algorithms that delineate the use query into its fundamental components, identifying elements, such as the desired outcome, the context in which the query is made, and any implicit constraints or preferences specified by the user.

As part of this analysis, in on example, the AI agent controller 206 utilizes LLMs and other AI capabilities to parse and evaluate the content of the query. The evaluation process involves one or more stages, including semantic analysis to grasp the meaning behind the words, syntactic analysis to understand the structure of the query, and pragmatic analysis to deduce the intended action or outcome. By performing such multi-layered analysis, the AI agent controller 206 can accurately determine what the user is asking for, even in complex or ambiguous situations.

Once the analysis is complete, the AI agent controller 206 proceeds to determine the sequence of tasks required to generate the desired outcome. This determination is based on a thorough understanding of the query and is influenced by the controller's ability to predict the most efficient and effective sequence of actions. The AI agent controller 206 considers various factors in this decision-making process, including the availability of resources, the capabilities of the AI agents 212 registered in the AI agent system 204, and the potential dependencies between different tasks.

To illustrate, if the user query 202 involves a request to process an image and extract text from it, the AI agent controller 206 might first identify if the user query 202 contain offensive content or request. Once the user query 202 is validated as non-offensive query, the AI agent controller 206 identifies the need to perform image processing tasks, such as noise reduction and image enhancement. Following that, it may sequence tasks for optical character recognition (OCR) and natural language processing to convert the extracted text into a structured format. Each task is carefully selected and ordered to ensure that the final outcome aligns with the user's original query.

The sequence of tasks determined by the AI agent controller 206 is not static, it is designed to be adaptive. As tasks are executed, the AI agent controller 206 continually monitors the outputs and may dynamically adjust the sequence based on real-time feedback from the system. This ensures that any unexpected results or changes in context are promptly addressed, allowing the system to remain flexible and responsive to the user's needs.

Following the determination of the task sequence, the AI agent controller 206 communicates this sequence to the CANAR 208. The CANAR 208 is configured for maintaining and managing a comprehensive repository of a plurality of registered technical agents within the AI agent system 204. The AI agent system 204 serves as the structural framework housing the AI agents 212, which are categorized and registered based on their specific functionalities. Each AI agent 212 within this system is designated to perform particular tasks, and these tasks span a wide array of AI-driven operations, such as Natural Language Processing, Speech Recognition, Machine Translation, and more.

Upon receiving the task sequence from the AI agent controller 206, the CANAR 208 queries its repository to identify which of the registered agents, represented as agents 210-1, 210-2, and 210-N, are capable of executing the tasks determined by the AI agent controller 206. Each of the AI agents 210-1, 210-2, 210-N corresponds to a specific website 210 or digital platform, and within each website 210, there are one or more AI agents 212 configured to perform the requisite tasks. The CANAR 208 evaluates the capabilities of these AI agents 212 and identifies those best suited to execute the specified tasks.

Upon successful identification of the capable AI agents 212, the CANAR 208 obtains affirmative responses from at least one of these agents and compiles a list of responding AI agents 212, which it then relays back to the AI agent controller 206. The AI agent controller 206 subsequently orchestrates the execution of the tasks by enabling the selected AI agents 212 to carry out their designated functions in the precise sequence previously determined. This orchestration may involve dynamic adjustments to the task sequence based on intermediate outputs received from the AI agents 212, ensuring that the outcome generated aligns with the user's original specifications and requirements.

The AI agent system, as illustrated in FIG. 2, is modeled as a directed graph denoted by G (V, E, r), where V represents the set of vertices, E represents the set of edges connecting these vertices, and r designates the root vertex. The vertices in this system are categorized into agents and tools. Each agent vertex V is represented by a tuple $T_i=(L_i, R_i, S_i, U_i)$, where Li refers to the language model utilized by the agent, including its type, such as Mistral, Llama3, ChatGPT, and its configuration settings, e.g., temperature, top_p, maximum tokens. Ri represents the role of the agent, encompassing its goal, direction, and available functions and actions, typically specified as a system prompt for Li. Si denotes the state of the agent, including its previous thoughts, actions, and interactions undertaken in response to user queries. Ui is the URL address of the agent on the web, potentially including the procedure for invoking it.

Each tool $j \in V$ is represented by a tuple $P_j=(F_j, C_j, U_j)$, where Fj defines the set of functionalities of the tool. When an edge et; $e_{ij} \in E$ connects a technical agent $i \in V$ with a tool $j \in V$, $F_j$ determines the action that the agent i can perform. Cj specifies the configurations associated with the tool, such as its input parameters (e.g., input data, API key) and the outcome information of the function (e.g., output type). Uj details the constraints and conditions necessary to execute the tool's functionality, such as supported language pairs in the case of a machine translation tool.

Edges $e_{ij}$ connect an agent $i \in V$ to either another agent or a tool $j \in V$ via a communication channel. Each broadcast message $m \in M_{ij}$ is represented by the tuple $m=(S_m, A_m, D_m)$, where Sm denotes the content of the message, Am indicates the action associated with the message, if any, such as invoking a child agent or tool, and Dm comprises the message metadata, including the timestamp, sender/receiver information, etc.

Agents within the system are classified into three distinct types, referred to as the AI agent controller (super agent) (r), the CAN agent ($d \in V$), and the technical agents ($t \in V$). The super agent, functioning as the root vertex, is responsible for receiving user queries, validating them against offensive content, and analyzing solution proposals from its child node, the CAN agent. The CAN agent is tasked with cataloging all the technical agents, ensuring the existence of an edge ($e_{ds} \in E$) that links the CAN agent ($d \in V$) to a technical agent ($s \in V$). The technical agents are specialized in executing specific functionalities within their respective domains, such as natural language processing, speech recognition, web search, and others. These three types of agents are equipped with various tools to perform functions like machine translation, speech recognition, and more. The agents have been described for illustration purpose, however, there may be more types of agents implemented to perform functions for execution of the present embodiment.

In one embodiment of the present disclosure, where a plurality of AI agent responds affirmatively to execute a particular task, the system may opt for optimizing AI agent selection. The optimization process may be integrated with a task coordination framework of the AI agents controller. The AI agent controllers, in addition to managing task allocation and sequencing, are configured to analyze the specific requirements of the user query and extract key features from the input data. Based on the extracted features, the AI agents controller optimizes the selection of the AI agent for executing the specific task based on different AI capabilities, such as natural language processing, speech recognition, or machine translation, associated with the AI agent. By employing a feature-based analysis, the AI agents controller can dynamically select the most appropriate AI model or agent for a given task. For example, if the task requires deep contextual understanding, a model like GPT-4 might be chosen, while for tasks requiring speed, a more efficient model like GPT-3.5-turbo could be selected. The optimization process thus ensures that each task is handled by the most suitable AI model, improving the efficiency and quality of the system's responses, while also managing resource allocation and performance trade-offs. The integration of the optimized selection mechanism enhances the system's adaptability to diverse tasks and user requirements.

Figure 3:
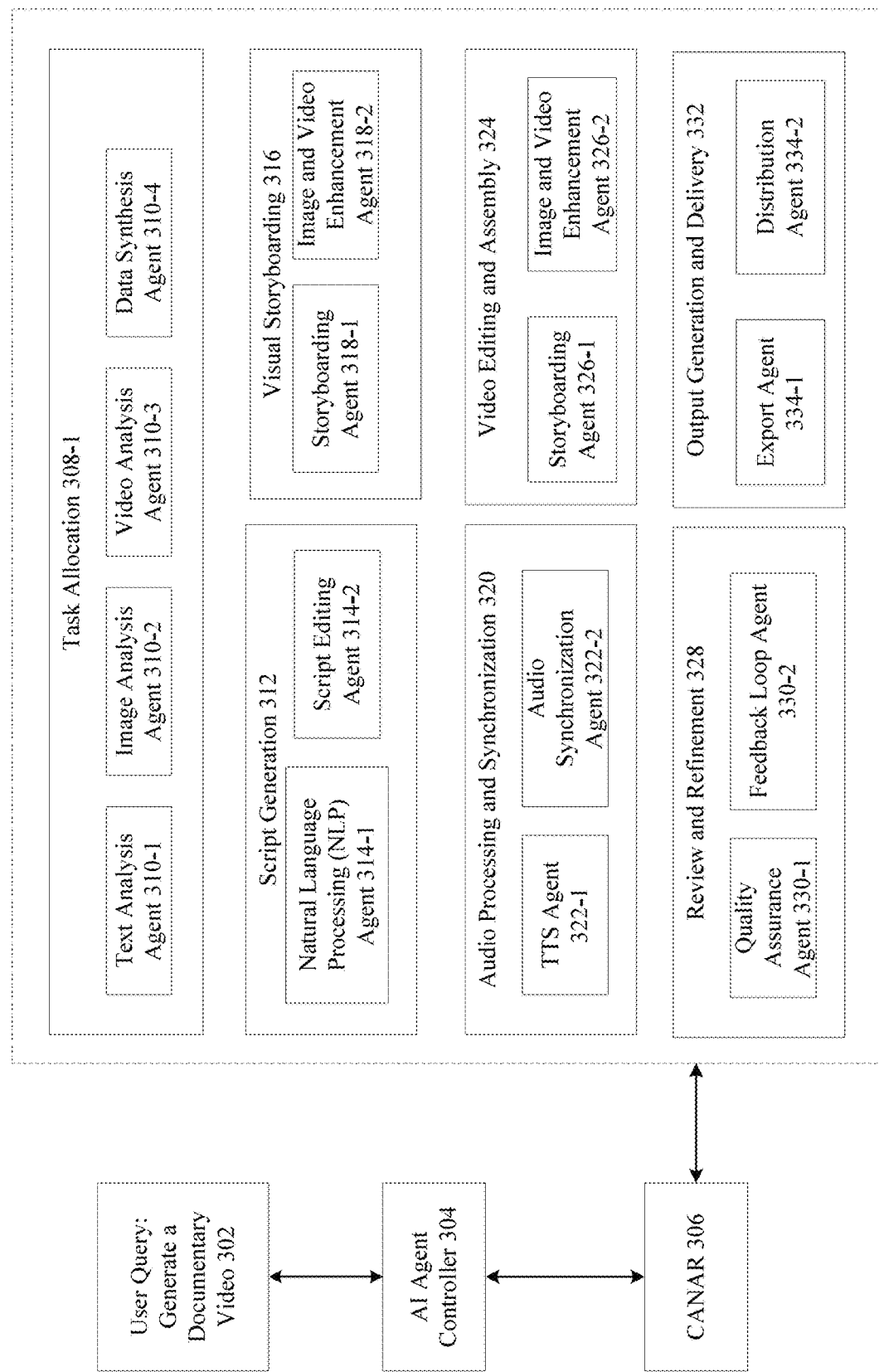
FIG. 3 illustrates an example of the AI agent system configured for task allocation and the utilization of AI agents within the context of generating a documentary video, according to certain embodiments.

FIG. 3 illustrates an example of a system designed for task allocation and the utilization of AI agents within the context of generating a documentary video. The system comprises a plurality of components, each assigned a specific task, as delineated by the reference numerals provided in the figure.

The process begins with the reception of a user query, such as "Generate a Documentary Video" 302, by the AI Agent Controller 304. Upon receiving this query, the AI Agent Controller 304 interacts with the CAN Agent 306 to allocate tasks to the relevant AI agents based on the requirements specified in the user query. The task allocation process 308-1 includes various AI agents, each designated to perform specialized functions to ensure the successful completion of the requested outcome.

The first task involves content gathering and organization, which utilizes several AI agents. The text analysis agent 310-1 scans the provided text documents to extract relevant content and identify key themes. The image analysis agent 310-2 processes the photos to identify important visual elements, categorizing them by relevance and tagging them for integration into the video. The video analysis agent 310-3 analyses the provided video clips, extracting key segments and identifying contexts that align with the documentary's narrative. Finally, the data synthesis agent 310-4 gathers and synthesizes additional related data, such as statistics or historical context, to enhance the documentary's content.

Following content gathering, the system progresses to the script generation stage 312, which includes the natural language processing (NLP) agent 314-1. The agent generates a draft script for the documentary, synthesizing new content based on the structured narrative. The script editing agent 314-2 then refines the draft script to ensure coherence and alignment with the documentary's theme.

The system further advances to the visual storyboarding task 316. The storyboarding agent 318-1 arranges the selected photos, video clips, and other visual elements in a sequence that aligns with the narrative structure. To ensure visual consistency, the image and video enhancement agent 318-2 enhances the quality of photos and video clips, adjusting for factors such as resolution and color balance.

The next stage involves audio processing and synchronization 320, where the text-to-speech (TTS) Agent 322-1 converts the script into a narrated audio track. The audio synchronization agent 322-2 ensures that this audio narration aligns with the visual elements, maintaining consistency between the script and the video/photo sequences.

Subsequently, the system moves to video editing and assembly 324. The storyboarding agent 326-1 assembles the photos, video clips, and synthesized data into a cohesive documentary video, incorporating necessary transitions and effects. The image and video enhancement agent 326-2 continues to ensure visual consistency throughout the video assembly process.

The system then undertakes a review and refinement process 328. The quality assurance agent 330-1 reviews the final video for errors or inconsistencies, while the feedback loop agent 330-2 allows for user input and adjustments, enabling refinements based on feedback.

At last, the system handles output generation and delivery 332. The export agent 334-1 renders the final documentary video in the specified format and resolution. The distribution agent 334-2 prepares the video for distribution, converting it into formats suitable for different platforms and embedding the necessary metadata for effective dissemination.

Figure 4:
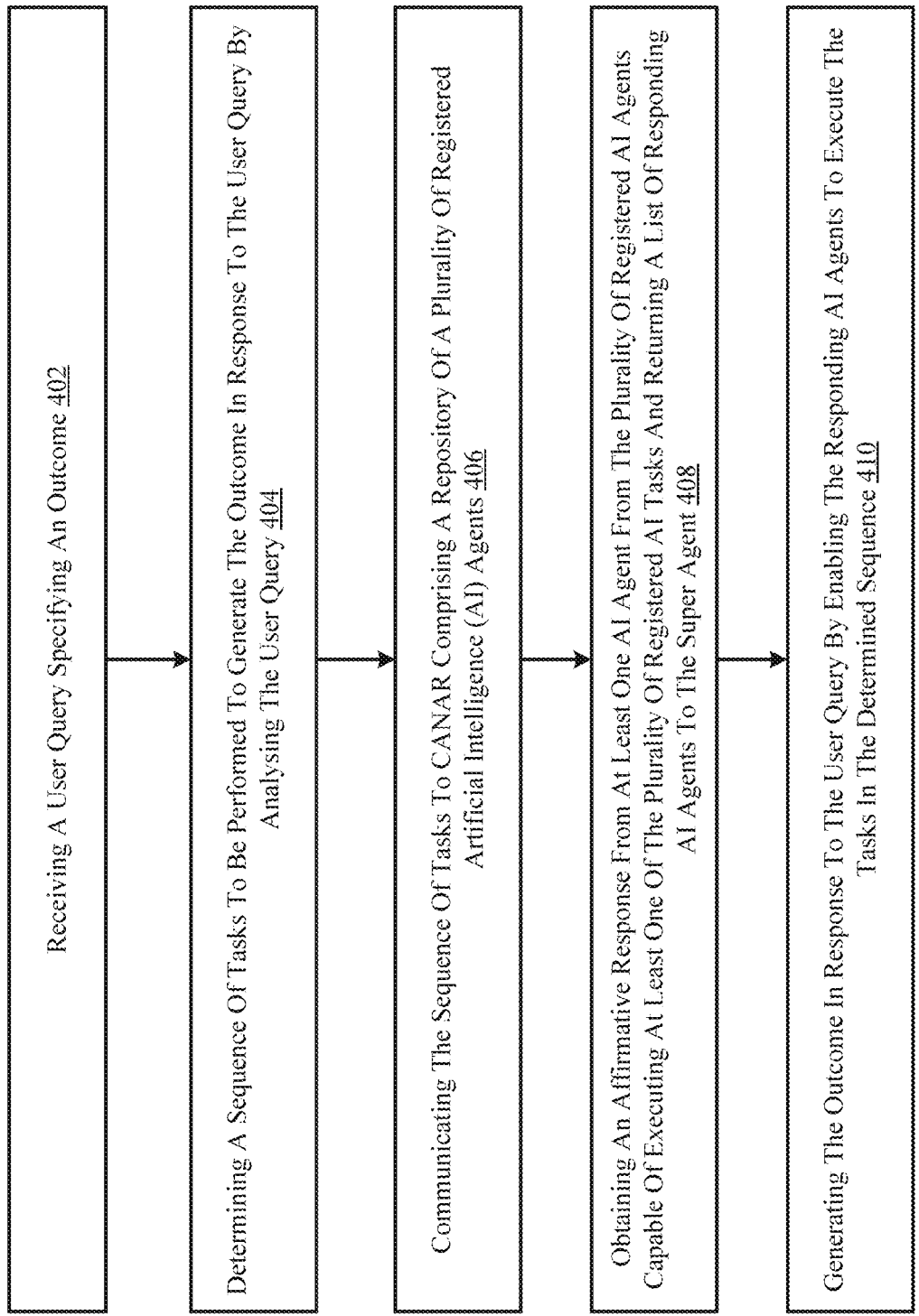
FIG. 4 illustrates an exemplary flow chart depicting a method for generating an outcome in response to a user query, according to certain embodiments.

FIG. 4 illustrates an exemplary flow chart depicting a method for generating an outcome in response to a user query, in accordance with an embodiment of the present disclosure.

At step 402, a user query specifying an outcome is received by the AI agent controller 206. The user query 202 may be communicated from a user device, wherein the user query defines the desired outcome that the user seeks to achieve. The AI agent controller 206 is configured to initiate the process by first receiving and registering the user query.

At step 404, the AI agent controller 206 is configured to determine a sequence of tasks that need to be performed to generate the outcome specified in the user query. The determination is achieved by analysing the content and context of the user query 202. The analysis involves breaking down the user query into its constituent tasks, each of which is essential for achieving the desired outcome. The tasks are identified and sequenced in a manner that optimizes the process flow toward the intended outcome.

At step 406, the sequence of tasks determined by the AI agent controller 206 is communicated to a CANAR 208. The CANAR 208 comprises a repository of a plurality of registered AI agents, each capable of executing specific tasks. The communication involves transmitting the sequence of tasks to the CANAR 208 for further processing.

At step 408, the CANAR 208 queries its repository of registered AI agents to obtain an affirmative response from at least one AI agent that is capable of executing at least one of the plurality of tasks identified. The CANAR 208 verifies the capabilities of the AI agents in its repository and matches them with the tasks required. Upon identifying suitable AI agents, the CANAR 208 compiles a list of responding AI agents and returns this list to the AI agent controller 206.

At step 410, the AI agent controller 206 is configured to generate the outcome in response to the user query by enabling the responding AI agents to execute the tasks in the determined sequence. The selected AI agents work in tandem, following the sequence of tasks, to achieve the desired outcome as specified in the user query 202. The AI agent controller 206 coordinates the execution process, ensuring that each task is performed efficiently and that the final outcome aligns with the user's requirements.

Figure 5:
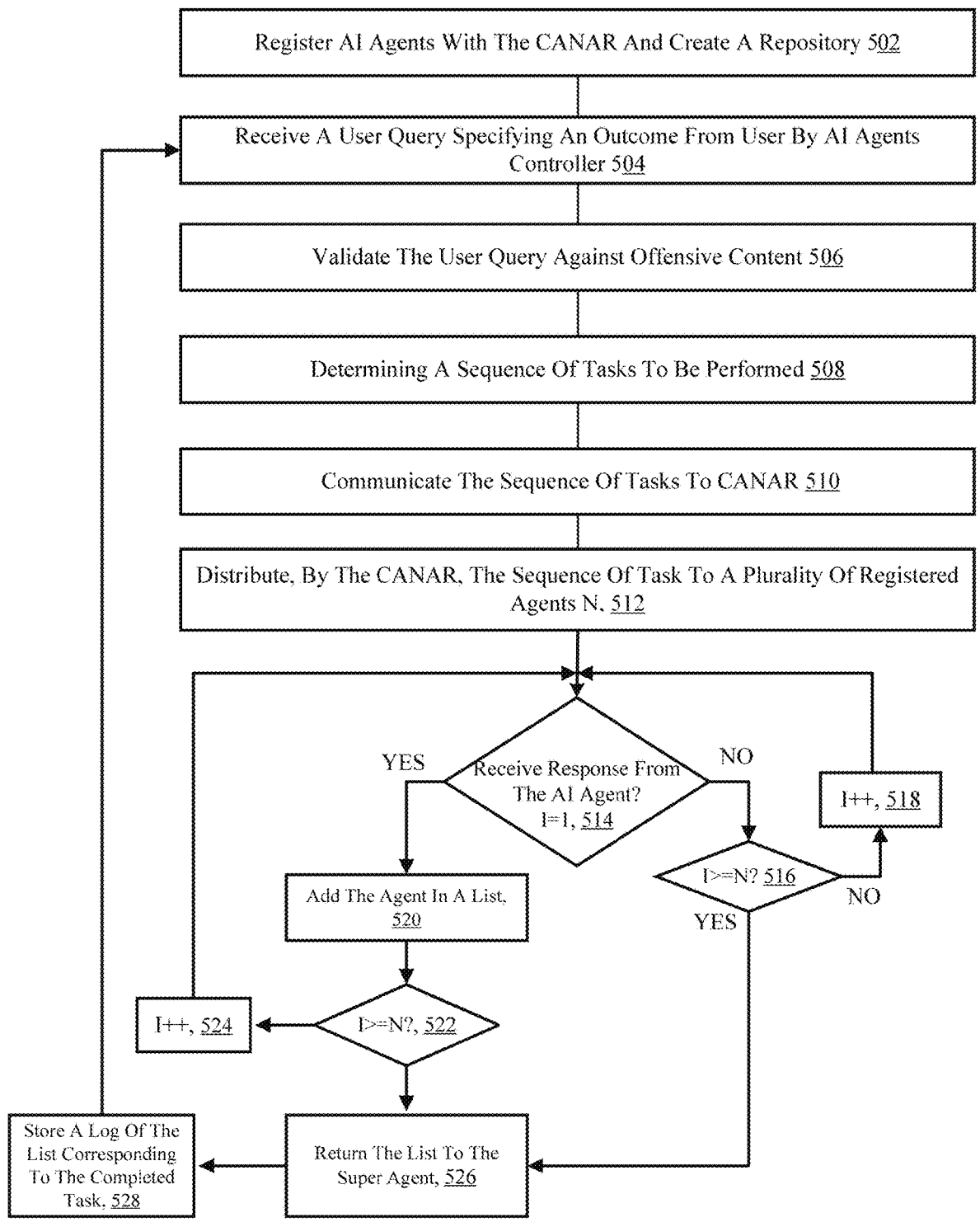
FIG. 5 is a flow chart of a method of generating an outcome in response to a user query, according to certain embodiments.

FIG. 5 is a flow chart of a method of generating an outcome in response to a user query, as implemented by an AI agent controller in a system comprising a plurality of AI agents. The method begins with the registration of AI agents with the CANAR 208 and the creation of a corresponding repository. This step involves adding AI agents to a database that the CANAR 208 can query when a user query is received. This process ensures that the system is aware of the available AI agents and their capabilities, which is critical for task allocation.

Upon receiving a user query specifying an outcome, the AI agent controller validates the user query against offensive content. This validation step is crucial to maintain the integrity and appropriateness of the system's operations, ensuring that the query does not contain any content that could be harmful or inappropriate.

Following validation, the AI agent controller determines a sequence of tasks that must be performed to generate the specified outcome. This determination involves analysing the user query to break it down into actionable tasks that the system's AI agents can execute. The AI agent controller then communicates the determined sequence of tasks to the CANAR 208.

The CANAR 208 distributes the sequence of tasks to a plurality of registered AI agents. The distribution process involves querying the registered AI agents to identify those that are capable of executing the required tasks. The CANAR 208 then sends out requests to the AI agents and waits for responses.

The method includes a loop where the CANAR 208 iterates through each AI agent, identified as i, to check if it is capable of performing a task. If the agent responds affirmatively, the CANAR 208 adds this agent to a list of agents that will participate in task execution. The process repeats until all registered AI agents, represented by N, have been queried. If the CANAR 208 receives a response from an AI agent, it increments the index i and continues querying the next agent until all agents have been considered.

Once the CANAR 208 has compiled a list of capable AI agents, it returns this list to the AI agent controller. The AI agent controller then enables the selected AI agents to execute the tasks in the determined sequence. During task execution, the CANAR 208 may continue to monitor and log the progress of each task, ensuring that each task is completed and the outcome is generated as specified by the user query.

The method further includes storing a log of the list corresponding to the completed tasks. This log serves as a record for optimizing future queries, allowing the system to learn from previous executions and improve the efficiency of task allocation and execution in subsequent operations.

Figure 6:
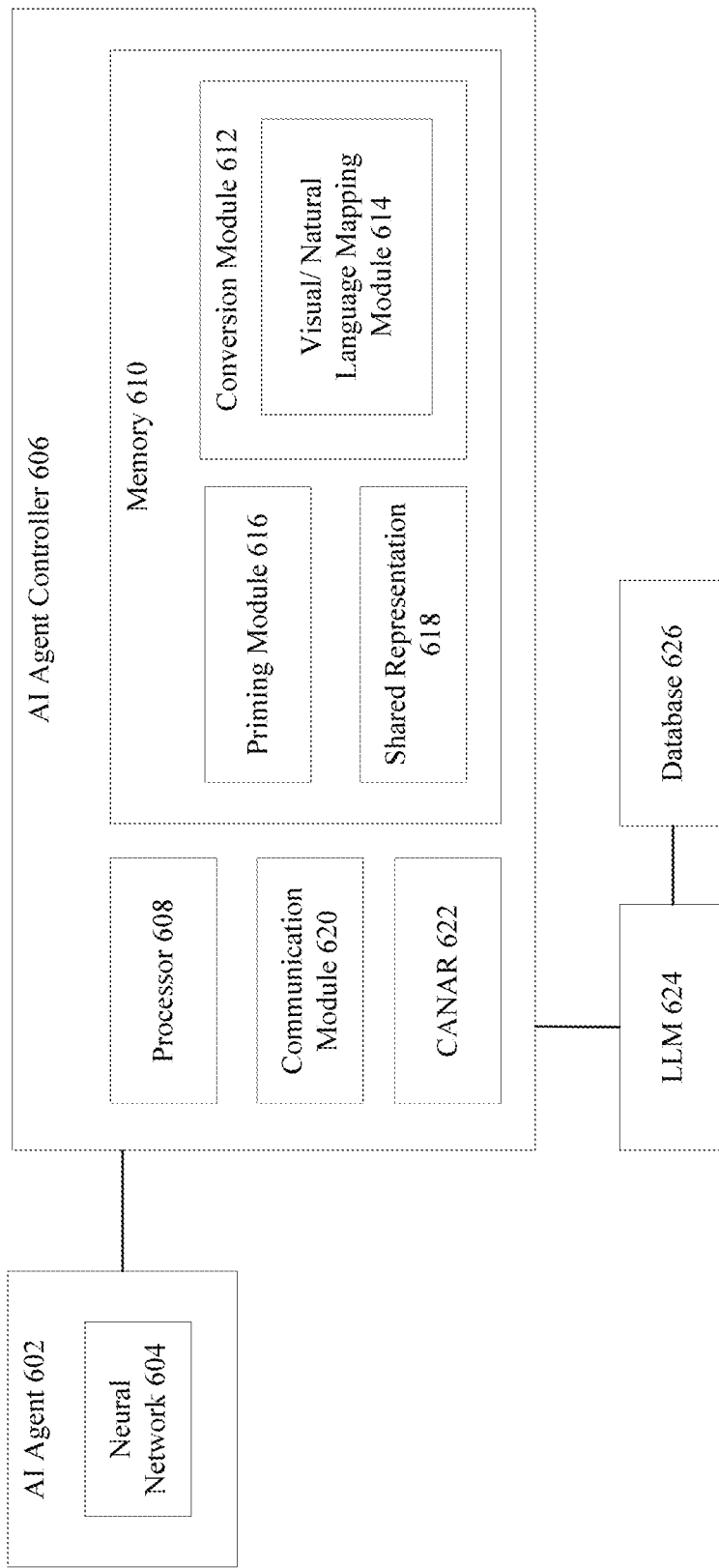
FIG. 6 illustrates an example of an AI agent within the AI agent system, according to certain embodiments.

FIG. 6 illustrates an example of an AI agent 602 within the AI agent system. In the illustrated example, the AI agent 602 includes a processor 608 and a memory 610. The memory 610 includes a conversion module 612, a visual/natural language mapping module 614, a priming module 616, and shared representation 618. The AI agent 602 is configured to communicate with an AI agent controller 606. The AI agent 602 is in communication with an LLM 624 and an CANAR 208 622, which are crucial for the AI agent's operation and task execution.

The AI agent 602 may query the AI agent controller 606, which uses the LLM 624 as an abstraction or generalization engine. Specifically, the AI agent 602 may use the LLM 624 to generalize past experiences to the context of current and/or past environment data of the AI agent 602 or to provide additional context, information, or suggestions as to what action or policy might be most appropriate. The action or policy may be deemed most appropriate based on information or representations-visual or in text or other form-that the AI agent 602 provides to the AI agent controller 606 about current and past observations and action space of the AI agent 602, as well as perceived goals of the AI agent 602.

The visual/natural language mapping module 614 within the memory 610 may be configured to convert visual data such as a digital image to a natural language description of the image, objects in the image, and/or action(s) occurring in the image or series of images. The conversion module 612 may be any system that outputs a natural language description of an image, objects within an image, and/or action(s) occurring in the image or a series of images. The visual data may include one or more images and/or videos. The visual/natural language mapping module 614 may be configured to receive the visual data directly from the AI agent 602, or indirectly from the AI agent 602 via another component such as the priming module 616.

The priming module 616 within the memory 610 is optimized to evaluate the relative value and success of the outputs from the LLM 624 in terms of enhancing the performance of the AI agent 602 in order to build a repository of proven mental models or thought templates to which the LLM 624 responds in a reliable, accurate, and structured way.

The communication module 620 enables the AI agent 602 to interact with other agents, systems, and components within the network, including communication with the CANAR 622, which manages the registration and interaction of AI agents within the system. The LLM 624 interacts with a database 626 that stores vast amounts of data and knowledge, allowing the AI agent 602 to access and utilize this information as needed. The shared representation 618 component within the memory 610 stores and manages representations of data that are commonly used across different tasks and modules within the AI agent 602.

The various embodiments of the present disclosure, described with reference to FIG. 1A-FIG. 6, provides advancements in AI-driven task management within multi-agent systems. The present disclosure ensures optimal task coordination through the integration of the AI agent controller 606 and the CANAR 622, which allocate tasks to the most suitable technical agents based on their capabilities and contextual relevance. Such dynamic task allocation enhances both accuracy and efficiency, delivering reliable outcomes in a timely manner.

The system's adaptive learning capabilities, enabled by the continuous training of CAN agents, allow for refinement of decision-making processes based on prior task executions. Such capability facilitates ongoing improvement in handling increasingly complex queries, ensuring the system remains responsive to evolving demands. The architecture supports scalability, seamlessly incorporating new agents as they become available.

The advanced inference models employed by CAN agents further contribute to precise, context-aware task assignments, enhancing the relevance and effectiveness of generated outcomes.

Figure 7:
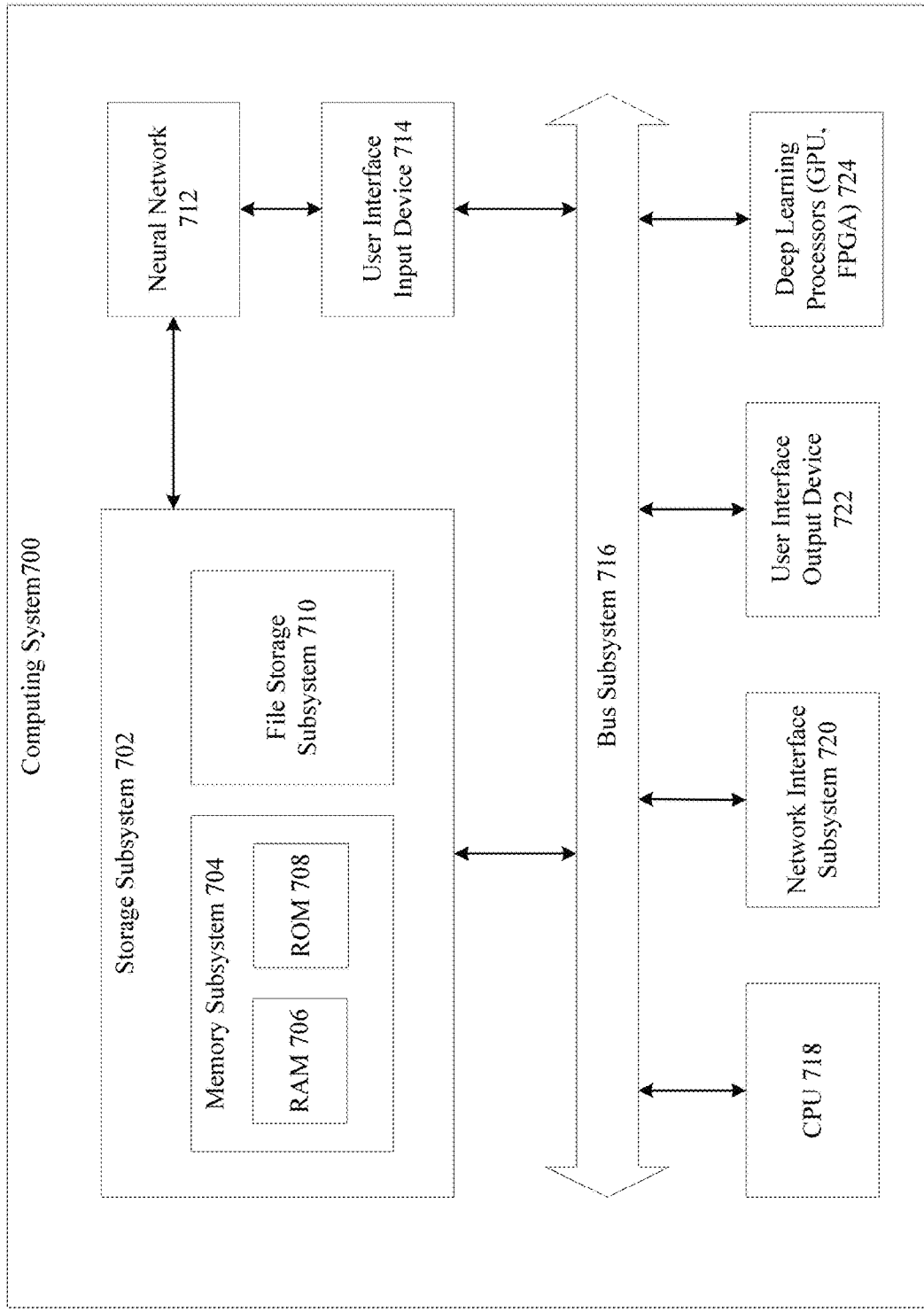
FIG. 7 shows an example computer system that can be used to implement the technology disclosed, according to certain embodiments.

FIG. 7 shows an example computer system 700 that can be used to implement the technology disclosed. The computer system 700 is a representation of the AI agent system 106, as described in FIG. 1A-FIG. 1E, and the AI agent system 204, as described in FIG. 2. The computer system 700 includes at least one central processing unit (CPU) 718 that communicates with a number of peripheral devices via bus subsystem 716. These peripheral devices can include a storage subsystem 702 including, for example, memory devices and a file storage subsystem 710, user interface input devices 714, user interface output devices 722, and a network interface subsystem 720. The input and output devices allow user interaction with computer system 700. Network interface subsystem 720 provides an interface to outside networks, including an interface to corresponding interface devices in other computer systems.

In one implementation, a neural network 712 is communicably linked to the storage subsystem 702 and the user interface input devices 714.

User interface input devices 714 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 700.

User interface output devices 722 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 700 to the user or to another machine or computer system.

Storage subsystem 702 stores programming and data constructs that provide the functionality of some or all of the modules and methods described herein. These software modules are generally executed by deep learning processors 724.

Deep learning processors 724 can be graphics processing units (GPUs), field-programmable gate arrays (FPGAs), application-specific integrated circuits (ASICs), and/or coarse-grained reconfigurable architectures (CGRAs). Processors 724 can be hosted by a deep learning cloud platform such as Google Cloud Platform™, Xilinx™, and Cirrascale™ Examples of processors 724 include Google's Tensor Processing Unit (TPU)™, rackmount solutions like GX4 Rackmount Series™, GX6 Rackmount Series™, NVIDIA DGX-1™, Microsoft's Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 704 used in the storage subsystem 702 can include a number of memories including a main random-access memory (RAM) 706 for storage of instructions and data during program execution and a read only memory (ROM) 708 in which fixed instructions are stored. A file storage subsystem 710 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 710 in the storage subsystem 702, or in other machines accessible by the processor.

Bus subsystem 716 provides a mechanism for letting the various components and subsystems of computer system 700 communicate with each other as intended. Although bus subsystem 716 is shown schematically as a single bus, alternative implementations of the bus subsystem can use multiple buses.

Computer system 700 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 700 depicted in FIG. 7 is intended only as a specific example for the purpose of illustrating the preferred implementations of the present technology disclosed. Many other configurations of computer system 700 are possible having more or fewer components than the computer system depicted in FIG. 7.

In various implementations, a learning system is provided. In some implementations, a feature vector is provided to a learning system. Based on the input features, the learning system generates one or more outputs. In some implementations, the output of the learning system is a feature vector. In some implementations, the learning system comprises an SVM. In other implementations, the learning system comprises an artificial neural network. In some implementations, the learning system is pre-trained using training data. In some implementations training data is retrospective data. In some implementations, the retrospective data is stored in a data store. In some implementations, the learning system may be additionally trained through manual curation of previously generated outputs.

In some implementations, an object detection pipeline is a trained classifier. In some implementations, the trained classifier is a random decision forest. However, it will be appreciated that a variety of other classifiers are suitable for use according to the present disclosure, including linear classifiers, support vector machines (SVM), or neural networks such as recurrent neural networks (RNN).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed computing environments where tasks are performed by remote processing devices that are linked through a communications network. In a distributed computing environment, program modules may be located in both local and remote computer system storage media including memory storage devices.

As shown in FIG. 7, computer system/server in computing node 700 is shown in the form of a general-purpose computing device. The components of computer system/server may include, but are not limited to, one or more processors or processing units, a system memory, and a bus that couples various system components including system memory to processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server typically includes a variety of computer system readable media. Such media may be any available media that is accessible by computer system/server, and it includes both volatile and non-volatile media, removable and non-removable media.

System memory can include computer system readable media in the form of volatile memory, such as random access memory (RAM) and/or cache memory. Algorithm Computer system/server may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory may include at least one program product having a set (e.g., at least one) of program modules that are conFIG.d to carry out the functions of embodiments of the disclosure.

Program/utility, having a set (at least one) of program modules, may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments as described herein.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

CLAUSES

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed, or elements thereof can be implemented in the form of a computer product, including a non-transitory computer readable storage medium with computer usable program code for performing the method steps indicated. Furthermore, one or more implementations and clauses of the technology disclosed, or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A computer-implemented method, comprising:
receiving, using an AI agent controller comprising a large language model, a user query from a user specifying;
determining, by the AI agent controller, a sequence of tasks to be performed to generate an outcome in response to the user query by analyzing the user query;
communicating, by the AI agent controller, the sequence of tasks to a Central Agent Name and Attribute Registry (CANAR) comprising a repository of a plurality of registered artificial intelligence (AI) agents, wherein the CANAR comprises a plurality of CAN agents;
obtaining, by the CANAR, an affirmative response from at least one AI agent from the plurality of registered AI agents capable of executing at least one of the sequence of tasks, and returning a list of responding AI agents to the AI agent controller; and
generating, by the AI agent controller, the outcome in response to the user query by enabling the responding AI agents to execute the tasks in the determined sequence.

2. The method of claim 1, further comprising validating, by the AI agent controller, the user query against offensive content before communicating the query to the CANAR.

3. The method of claim 1, further comprising cataloging, by the CANAR, the AI agents based on their specific functionalities and geographical availability.

4. The method of claim 1, further comprising storing, by the AI agent controller, a log of completed tasks and the corresponding AI agents to optimize future queries.

5. The method of claim 1, further comprising dynamically prioritizing, by the AI agent controller, the tasks based on user preferences or urgency of the query.

6. The method of claim 1, further comprising updating, by the CANAR, the repository of registered AI agents in real-time as new agents become available or existing agents are modified.

7. The method of claim 1, further comprising interacting, by the AI agent controller, with the AI agents that have sent the affirmative response to the user query to refine the task execution strategy based on intermediate outputs from the AI agents.

8. The method of claim 1, wherein the AI agents include functionalities for tasks selected from the group consisting of automatic speech recognition (ASR), machine translation (MT), and text-to-speech (TTS).

9. The method of claim 1, further comprising analyzing, by the AI agent controller, the intermediate outputs from the AI agents and adjusting the sequence of tasks based on the analysis.

10. The method of claim 1, wherein the CANAR is further configured to distribute each task based on geographical proximity of an AI agent, selected from a plurality of AI agents that sent affirmative response to execute the task, to optimize task execution.

11. A system comprising:
at least one processor; and
a memory device storing computer-executable instructions that, when executed by the at least one processor, cause the system to:
receive, using an AI agent controller comprising a large language model, a user query specifying an outcome;
determine, by the AI agent controller, a sequence of tasks to be performed to generate an outcome in response to the user query by analyzing the user query;
communicate, by the AI agent controller, the sequence of tasks to a Central Agent Name and Attribute Registry (CANAR) comprising a repository of a plurality of registered technical agents, wherein the CANAR comprises a plurality of CAN agents;
obtain, by the CANAR, an affirmative response from at least one agent from the plurality of registered AI agents capable of executing at least one of the plurality of registered AI tasks and a list of responding AI agents to the AI agent controller; and generate, by the AI agent controller, the outcome in response to the user query by enabling the responding AI agents to execute the tasks in the determined sequence.

12. The system of claim 11, the system is further configured to validate, by the AI agent controller, the user query against offensive content before communicating the query to the CANAR.

13. The system of claim 11, the system is further configured to catalog, by the CANAR, the technical agents based on their specific functionalities and geographical availability.

14. The system of claim 11, the system is further configured to store a log of completed tasks and the corresponding technical agents to optimize future queries.

15. The system of claim 11, the system is further configured to dynamically prioritize the tasks based on user preferences or urgency of the query.

16. The system of claim 11, the system is further configured to update the repository of registered technical agents in real-time as new agents become available or existing agents are modified.

17. The system of claim 11, the system is further configured to interact with the AI agents that have sent the affirmative response to the user query to refine the task execution strategy based on intermediate outputs from the technical agents.

18. The system of claim 11, the system is further configured to analyze the intermediate outputs from the technical agents and adjust the sequence of tasks based on the analysis.

19. The system of claim 11, wherein the CANAR is further configured to distribute each task based on geographical proximity of an AI agent, selected from a plurality of AI agents that sent affirmative response to execute the task, to optimize task execution.

20. A non-transitory computer-readable storage medium storing instructions which, when executed by at least one processor, cause the at least one processor to perform operations comprising:
receiving, using an AI agent controller comprising a large language model, a user query from a user;
determining, by the AI agent controller, a sequence of tasks to be performed to generate an outcome in response to the user query by analysing the user query;
communicating, by the AI agent controller, the sequence of tasks to a Central Agent Name and Attribute Registry (CANAR) comprising a repository of a plurality of registered artificial intelligence (AI) agents, wherein the CANAR comprises a plurality of CAN agents;
obtaining, by the CANAR, an affirmative response from at least one AI agent from the plurality of registered AI agents capable of executing at least one of sequence of tasks and returning a list of responding AI agents to the AI agent controller; and
generating, by the AI agent controller, the outcome in response to the user query by enabling the responding AI agents to execute the tasks in the determined sequence.

\* \* \* \* \*